(12) United States Patent
Alsahlawi et al.

(10) Patent No.: US 10,711,566 B2
(45) Date of Patent: Jul. 14, 2020

(54) WELLBORE CEMENTING SYSTEM

(71) Applicant: Saudi Arabian Oil Company, Dhahran (SA)

(72) Inventors: Ziyad Alsahlawi, Dhahran (SA); Ossama R. Sehsah, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/037,033

(22) Filed: Jul. 17, 2018

(65) Prior Publication Data
US 2020/0024927 A1 Jan. 23, 2020

(51) Int. Cl.
| E21B 33/16 | (2006.01) |
| E21B 21/10 | (2006.01) |
| E21B 33/05 | (2006.01) |
| E21B 44/00 | (2006.01) |

(52) U.S. Cl.
CPC ............. *E21B 33/16* (2013.01); *E21B 21/10* (2013.01); *E21B 33/05* (2013.01); *E21B 44/005* (2013.01)

(58) Field of Classification Search
CPC ................................ E21B 33/16; E21B 21/10
USPC ....................................................... 166/285
See application file for complete search history.

(56) References Cited

U.S. PATENT DOCUMENTS

| 4,036,301 A * | 7/1977 | Powers ................ C04B 20/1018 166/293 |
| 6,527,051 B1 | 3/2003 | Reddy et al. |
| 7,156,174 B2 | 1/2007 | Roddy et al. |
| 8,047,282 B2 * | 11/2011 | Lewis .................... C09K 8/467 166/177.1 |
| 8,245,783 B2 | 8/2012 | Lewis et al. |
| 9,416,050 B2 | 8/2016 | Seidl et al. |
| 2009/0159281 A1 * | 6/2009 | Herrera ................... E21B 7/203 166/285 |
| 2009/0321074 A1 | 12/2009 | Freeman |
| 2011/0048713 A1 | 3/2011 | Lewis et al. |
| 2011/0132606 A1 | 6/2011 | Demong et al. |
| 2015/0101810 A1 | 4/2015 | Aines et al. |
| 2017/0002257 A1 | 1/2017 | Pisklak et al. |

FOREIGN PATENT DOCUMENTS

| GB | 1 265 708 A | 3/1972 |
| WO | WO-2011/023934 A2 | 3/2011 |

OTHER PUBLICATIONS

International Search Report for PCT/IB2018/057701, 5 pages (dated Mar. 29, 2019).
Written Opinion for PCT/IB2018/057701, 8 pages (dated Mar. 29, 2019).

* cited by examiner

*Primary Examiner* — William D Hutton, Jr.
*Assistant Examiner* — Ashish K Varma
(74) *Attorney, Agent, or Firm* — Choate, Hall & Stewart LLP; Charles E. Lyon; Alexander D. Augst

(57) ABSTRACT

An example wellbore cementing system includes a casing to line at least part of a wellbore, and a pipe to introduce cement slurry containing capsules into the wellbore. The capsules include an accelerator. The accelerator reacts with the cement slurry to affect a thickening time of the cement slurry. The example system also includes a substructure having shearing pins. The substructure is arranged to receive the cement slurry from the pipe. The substructure is configured rotate to break at least some of the capsules in the cement slurry.

22 Claims, 7 Drawing Sheets

WELLBORE CEMENTING SYSTEM

TECHNICAL FIELD

This specification relates generally to example systems and techniques for cementing part of a wellbore.

BACKGROUND

During construction of an oil or gas well, a drill string having a drill bit bores through earth, rock, and other materials to form a wellbore. The drilling process includes, among other things, pumping drilling fluid down into the wellbore, and receiving return fluid and materials from the wellbore at the surface. Part of the well construction process includes incorporating casing and production tubing into the wellbore. Casing supports the sides of the wellbore and protects components of the well from outside contaminants. The casing may be cemented in place.

After the wellbore reaches a certain depth, drilling equipment may be removed from the wellbore, leaving an extended open hole. An isolation barrier may be formed in the wellbore's extended open hole. The isolation barrier may include cement. The "waiting-on-cement" (WOC) time is the time required for cement slurry used to produce the isolation barrier to thicken to a prescribed point. In an example, the WOC time is the time required for cement slurry to thicken enough to produce a compressive force of 500 pounds-per-square-inch (PSI). For some types of cement slurry, the WOC time may be about 33 hours.

During the WOC time, other activities cease. Accordingly, extended WOC times can delay completion of the well and can increase the cost of completing the well.

SUMMARY

An example wellbore cementing system includes a casing to line at least part of a wellbore, and a pipe to introduce cement slurry containing capsules into the wellbore. The capsules include an accelerator. The accelerator reacts with the cement slurry to affect a thickening time of the cement slurry. The example system also includes a substructure having shearing pins. The substructure is arranged to receive the cement slurry from the pipe. The substructure is configured rotate to break at least some of the capsules in the cement slurry. The example system also includes one or more of the following features, either alone or in combination.

The accelerator may include calcium dichloride ($CaCl_2$), anhydrous sodium metasilicate or both $CaCl_2$ and anhydrous sodium metasilicate. The accelerator may be at least 4% by weight of the cement slurry. The substructure may be configured rotate within the cement slurry to produce a turbulent flow within the cement slurry. The turbulent flow may have sufficient force to break at least some of the capsules.

The example wellbore cementing system may include one or more pumps to force the cement slurry through the pipe. The one or more pumps may be controllable to pump the slurry at a rate that produces the turbulent flow. The example system may include a control system to control operation of the one or more pumps. The control system may include a computer system.

The substructure may extend from a part uphole to a part downhole. The shearing pins may be located at the part downhole. The capsules melt, at least partly, at a temperature of a region between the casing and a bottom of the wellbore.

The accelerator may affect the thickening time of the cement slurry by reducing the thickening time of the cement slurry relative to a thickening time of cement slurry that does not include the accelerator.

An example method of cementing at least part of a wellbore includes forcing, into the at least part of the wellbore, cement slurry that includes capsules. The capsules include an accelerator. The accelerator is produced to react with the cement slurry to affect a thickening time of the cement slurry. The example method also includes breaking at least some of the capsules using a shearing substructure located in the wellbore, breaking at least some of the capsules using a turbulent flow produced within the cement slurry in the wellbore, and melting at least some of the capsules within the cement slurry in the wellbore. The example method also includes one or more of the following features, either alone or in combination.

The accelerator may include calcium dichloride ($CaCl_2$), anhydrous sodium metasilicate, or both $CaCl_2$ and anhydrous sodium metasilicate. The accelerator may be at least 4% by weight of the cement slurry.

The substructure may be configured rotate within the cement slurry to produce the turbulent flow within the cement slurry. Force of the cement slurry caused by the turbulent flow may cause at least some of the capsules to break.

The example method of cementing at least part of a wellbore may include controlling one or more pumps to pump the cement slurry through the pipe. The one or more pumps may be controllable to pump the slurry at a rate that produces the turbulent flow. The example method may include controlling the pumps and the substructure using commands output by a control system. The control system may include a computer system.

The substructure may extend from a part uphole to a part downhole. The shearing substructure may include shearing pins located at the part downhole to break at least some of the capsules. The capsules may melt, at least partly, at a temperature in a region between the casing and a bottom of the wellbore.

The accelerator may affect the thickening time of the cement slurry by reducing the thickening time of the cement slurry relative to a thickening time of cement slurry that does not include the accelerator.

Advantage of the example methods and systems may include one or more of the following. The WOC time may be reduced without changing the composition of the cement slurry, except to add the capsules. Sonic waves or electromagnetic signals may not be required to break the capsules when the capsules are downhole. Secondary and tertiary activation methods reduce the chances that capsules will go unbroken and, as a result, not achieve an expected reduction in WOC time.

Any two or more of the features described in this specification, including in this summary section, may be combined to form implementations not specifically described in this specification.

At least part of the methods and systems described in this specification may be controlled by executing, on one or more processing devices, instructions that are stored on one or more non-transitory machine-readable storage media. Examples of non-transitory machine-readable storage media include read-only memory (ROM), an optical disk drive, memory disk drive, and random access memory (RAM). At least part of the methods and systems described in this specification may be controlled using a data processing system comprised of one or more processing devices and memory storing instructions that are executable by the one or more processing devices to perform various control operations.

The details of one or more implementations are set forth in the accompanying drawings and the description subsequently. Other features and advantages will be apparent from the description and drawings, and from the claims.

DESCRIPTION OF THE DRAWINGS

Like reference numerals in different figures indicate like elements.

DETAILED DESCRIPTION

Described in this specification are example systems and techniques for cementing part of a wellbore. In an example, casing lines part of the wellbore. A pipe, known as a cement stinger, is inserted downhole through the casing and into a part of the wellbore that is not lined. The pipe includes a substructure, known as a sub, at a terminal end of the pipe. In this example, the substructure is a shearing substructure that includes shearing pins configured for rotation. Pumps, which may be located at the surface, force cement slurry through the pipe and through the substructure. The cement slurry includes capsules containing an accelerator. The accelerator reacts with the cement slurry to affect—for example, to reduce—the waiting-on-cement (WOC), or thickening, time of the cement slurry.

The capsules release the accelerator into the cement slurry, causing the cement slurry to thicken more quickly than cement slurry having an identical composition but that does not include the accelerator. In some implementations, there are three ways to release, and thereby activate, the accelerator. First, the slurry containing the capsules passes through the shearing pins of the substructure. The shearing pins cause at least some of the capsules to break, thereby releasing accelerator into the cement slurry. Some capsules, however, may not break. Accordingly, the rotation of the substructure causes a turbulent flow within the cement slurry in the wellbore. This turbulent flow produces sufficient force to cause at least some of the unbroken capsules to break, thereby releasing accelerator into the cement slurry. Some capsules still may not break. Those capsules, however, will melt due to the relatively high temperatures downhole. Melting causes accelerator to be released into the cement slurry, much like breaking.

Figure 1:
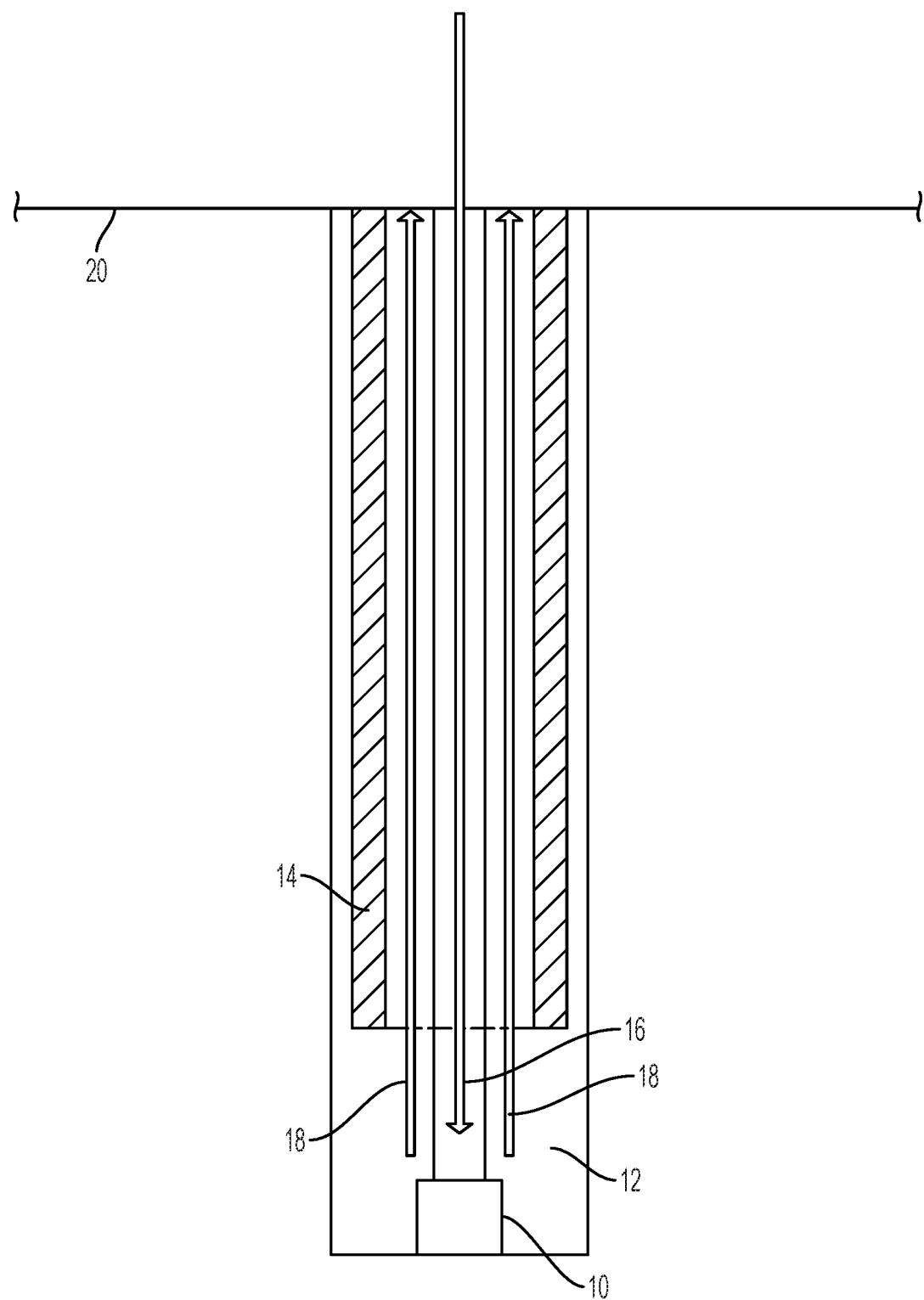
FIG. 1 is a cut-away, side view of an example wellbore during drilling.

FIG. 1 shows an example of a wellbore in which the preceding cementing systems and methods may be implemented. As shown in FIG. 1, to produce a well, a drill 10 bores through earth, rock, and other materials to form a wellbore 12. In some implementations, the drill includes a drill bit to cut through earth, rock, and other materials, and a drill string to lower the drill bit downhole. The drilling process includes, among other things, pumping drilling fluid 16 down into the wellbore, and receiving return fluid 18 containing materials from the wellbore at surface 20. In some implementations, the drilling fluid includes water- or oil-based mud. In some implementations, the return fluid contains mud, rock, and other materials to be evacuated from the wellbore. After a target depth is reached, the drill, including the drill string and the drill bit, is removed from the wellbore.

Casing may be incorporated into the wellbore. The casing, such as casing 14, supports the sides of the wellbore, and protects components of the well from outside contaminants. The casing may be cemented in place. Cementing operations include introducing cement slurry into the space between the casing and the wellbore, and allowing the cement slurry to set. Allowing the cement slurry to set may include allowing the cement slurry to reach a predefined hardness.

Figure 2:
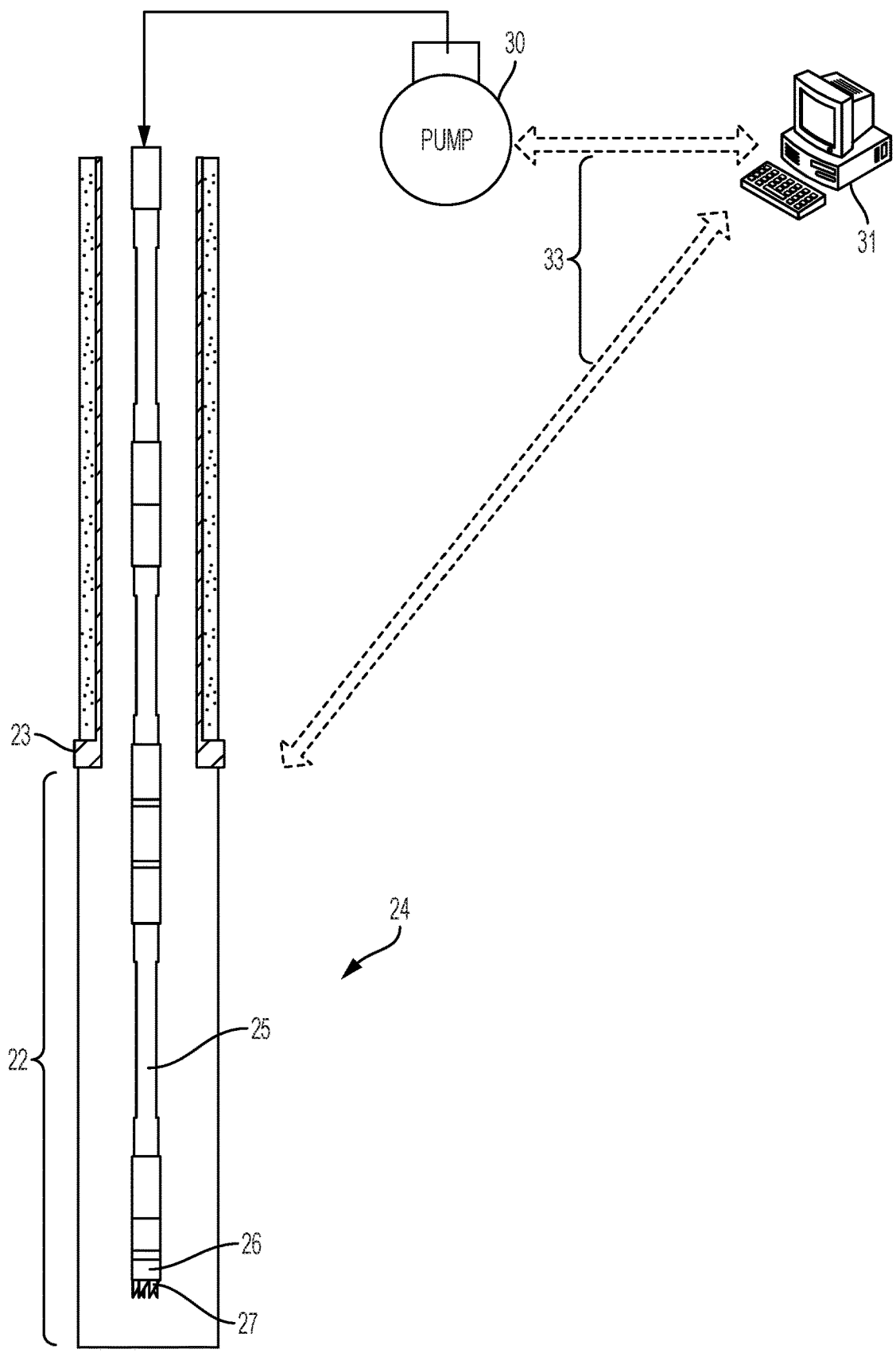
FIG. 2 is a cut-away, side view of the wellbore configured to include an example system for cementing an extended open hole of the wellbore.

Referring to FIG. 2, cementing operations may also be performed to isolate extended open hole 22, casing shoe 23, and adjacent hydrocarbon zones 24. The extended open hole includes the part of the wellbore that extends below the last casing. In some implementations, to perform the cementing operations, a pipe 25 is run downhole. An example pipe of this type is known as a cement stinger. The pipe includes an internal channel to pass cement slurry from the surface to extended open hole 22. The cement slurry may be forced downhole using one or more pumps 30. In this example, pipe 25 terminates in a substructure 26. Substructure 26 is a shearing substructure. In this example, substructure 26 includes shearing pins 27. The sheering pins are configured to rotate to produce a shearing force. A control system 31 may control the rate of rotation and thereby vary the shearing force.

As explained, the cement slurry includes capsules containing an accelerator. The accelerator reacts with the cement slurry to affect—for example, to reduce—the WOC, or thickening, time of the cement slurry. Examples of accelerators that may be used with the cement slurry include calcium dichloride ($CaCl_2$) and anhydrous sodium metasilicate. In some implementations, the size of the capsules is in a range of about 20 microns ($\mu$) in diameter or length to about 100$\mu$ in diameter or length. In general, the larger the capsules are, the more easily the capsules are broken using the shearing pins. In some implementations, the capsules are constructed to melt at minimum temperatures in a range of about 220° Fahrenheit (F.) (about 104° Celsius (C.)) to about 240° F. (about 115° C.).

In some implementations, the accelerator is at least 1% by weight of the cement slurry. In some implementations, the accelerator is at least 2% by weight of the cement slurry. In some implementations, the accelerator is at least 3% by weight of the cement slurry. In some implementations, the accelerator is at least 4% by weight of the cement slurry. In some implementations, the accelerator is at least 5% by weight of the cement slurry. In some implementations, the accelerator is at least 6% by weight of the cement slurry. In some implementations, the accelerator is at least 7% by weight of the cement slurry. In some implementations, the accelerator 8% by weight of the cement slurry or more. The amount of the accelerator in the cement slurry may depend on factors such as the type of the accelerator that is being used, the composition of the cement slurry, the pressure downhole, the temperature downhole, and the substructure being used. The amount of accelerator in the cement slurry may varied by changing the number of capsules in the cement slurry or the size of the capsules in the cement slurry, for example.

FIG. 2 also shows an example pump 30 configured to force the cement slurry from the surface, through pipe 25, and into extended open hole 22. The operation of pump 30 may be controlled by control system 31. Control system 31 may be or include a computing system having non-transitory, machine-readable computer memory and one more processing devices, such as a microprocessor, digital signal processor, or the like. The memory may store instructions that are executable by the processing devices to control drilling operations, including operation of the pump to force cement slurry downhole and rotation of the shearing pins. In addition, sensors (not shown) that may be located within the wellbore may provide sensor readings to the control system. These readings may affect control of the drilling and cementing operations. For example, temperature sensors, pressure sensors, or both temperature and pressure sensors may be located downhole, such as in the vicinity of extended open hole 22. Readings from these sensors may affect the rate at which slurry is forced downhole, the rate at which the shearing pins rotate, or both. For example, the shearing pins may be controlled to rotate faster to produce greater shearing forces and turbulent flow downhole in cases where temperatures downhole are not high enough to promote melting of capsules containing the accelerator. Bidirectional communication signals transmitted between control system 31, pump 30, and the sensors are represented conceptually using dashed arrows 33. The signals may be transmitted wirelessly or using wires, such as Ethernet. The signals may include commands to control the pump, the substructure, or both.

Figure 3:
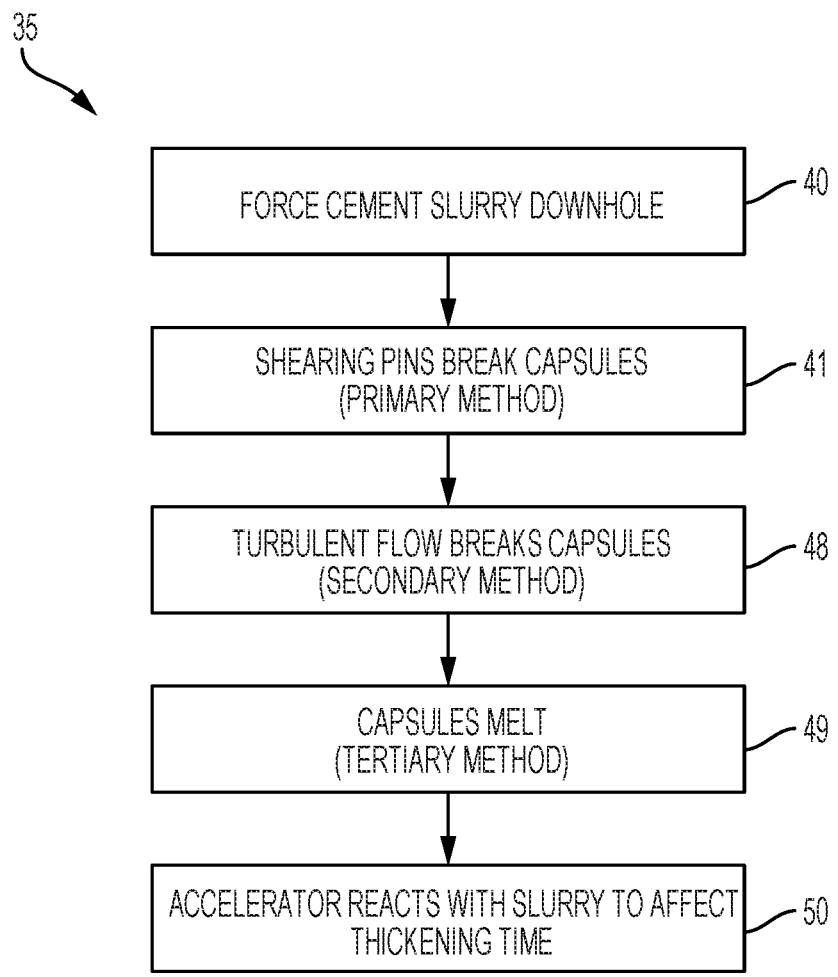
FIG. 3 is a flowchart showing example operations that may be performed to cement the extended open hole.

FIG. 3 is a flowchart showing an example process 35 for cementing at least part of a wellbore. In some implementations, process 35 includes a primary method of adding the accelerator to the cement slurry, a secondary method of adding the accelerator to the cement slurry, and a tertiary method of adding the accelerator to the cement slurry. In an example, the primary method includes breaking at least some of the capsules using the shearing substructure; the secondary method includes breaking at least some of the capsules using a turbulent flow produced within the cement slurry by the shearing substructure; and the tertiary method includes melting at least some of the capsules in the cement slurry.

Figure 4:
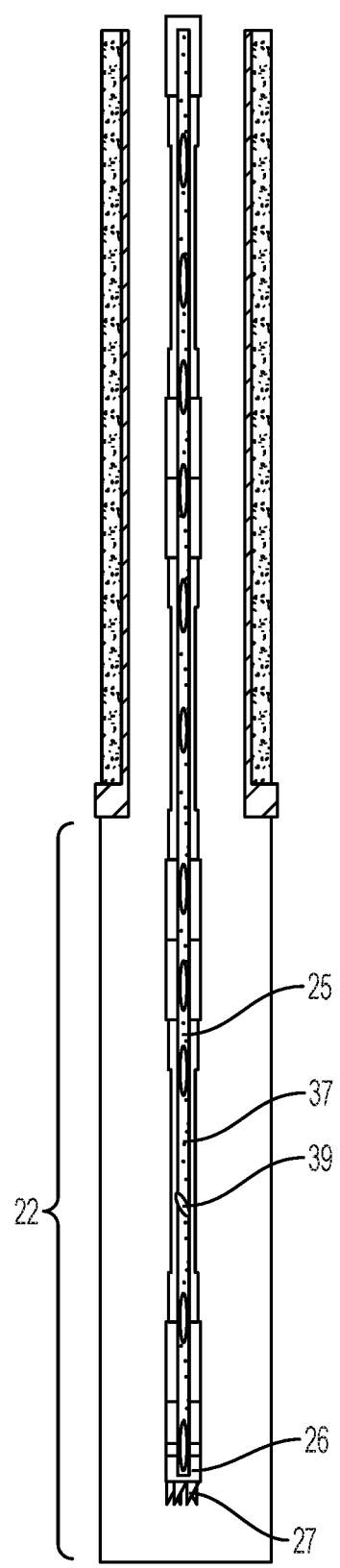
FIGS. 4, 5, 6, and 7 are a cut-away, side views of the wellbore at different stages during cementing of the extended open hole.

Referring also to FIG. 4, cement slurry 37 that includes capsules 39 containing accelerator is forced (40) downhole through pipe 25—the cement stinger. As explained, one or more pumps 30 may forces the cement slurry into the pipe and downhole towards, and into, extended open hole 22. The cement slurry, including the capsules, passes through shearing pins 27 of substructure 26 upon exiting the pipe. The shearing pins are controlled to rotate while the cement slurry, including the capsules, exits the pipe. This rotation produces a shearing force that is sufficient to break (41) (FIG. 3) at least some of the capsules and thereby release accelerator contained in the capsules into the cement slurry. In some implementations, a majority—for example, greater than 50%—of the capsules are broken through force generated using the shearing pins. Because the shearing pins break a majority of the capsules, the shearing pins may be considered the primary mechanism for adding accelerator to the cement slurry. Alternatively, the shearing pins may be considered the primary mechanism for adding the accelerator to the cement slurry because the shearing pins are the first mechanism in a sequence of mechanisms that are capable of releasing accelerator from the capsules.

Figure 5:
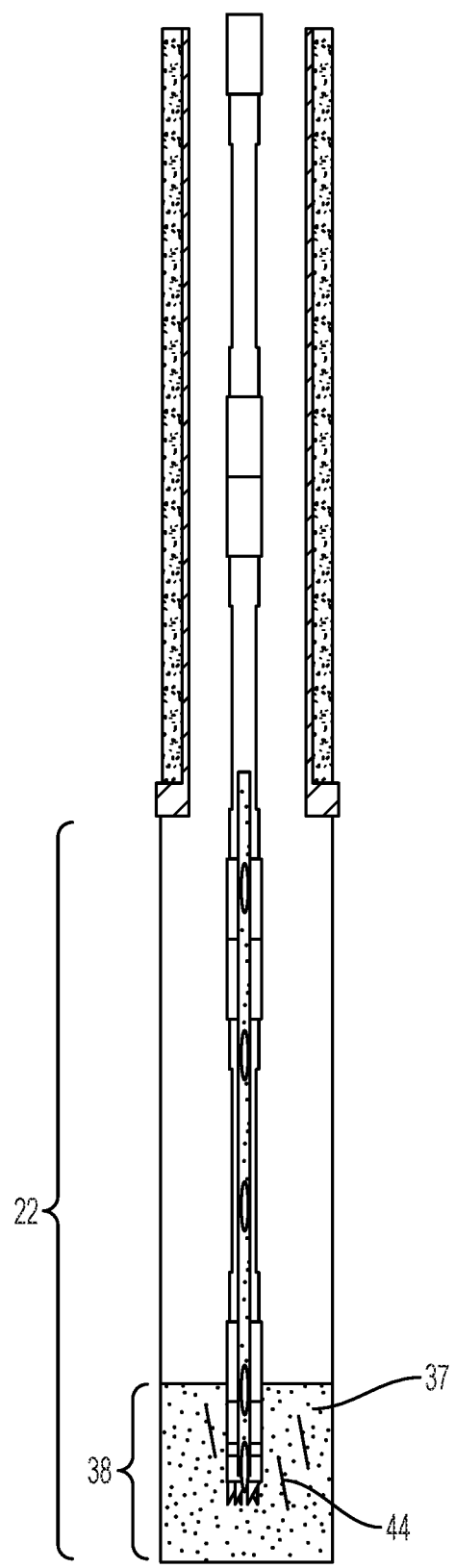
Figure 6:
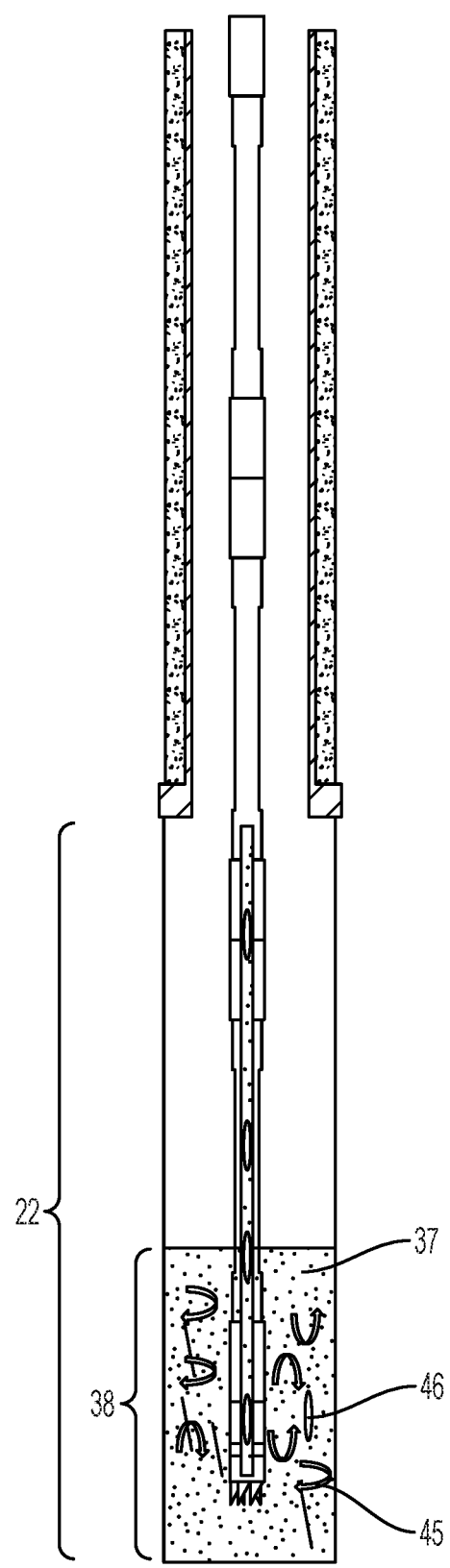

FIG. 5 shows released accelerator 44 mixing with the cement slurry 37 in a pool 38 formed at the bottom of extended open hole 22. Here, the accelerator is released by the shearing pins mechanically breaking capsules containing the accelerator. However, in some cases, the shearing pins may not be successful at breaking all capsules that pass through substructure 26. At least some of the remaining unbroken capsules may then be broken using hydromechanics. More specifically, in some implementations, substructure 26 may be controlled—for example, using the control system—to produce a turbulent flow within pool 38 of cement slurry 37 at the bottom of extended open hole 22. An example turbulent flow includes a fluid flow in which a velocity of the fluid at various points within a volume of the fluid undergoes irregular fluctuations. For example, the velocity may vary erratically in magnitude, in direction, or in both magnitude and direction. FIG. 6 depicts, conceptually, turbulent flow 45 within pool 38 of cement slurry 37 through use of curved arrows pointing in random directions.

Rotation of the shearing pins may produce fluid circulation within the cement slurry that causes the turbulent flow. The rotation of the shearing pins may vary in speed over time or may be constant over time to produce the turbulent flow. In any case, the turbulent flow may be calibrated to produce sufficient fluid force to break (48) (FIG. 3) at least some of the unbroken capsules contained in the cement slurry. In some implementations, the fluid force may be sufficient to break a majority—for example, greater than 50%—of the unbroken capsules 46 in the cement slurry. Because the fluid force breaks a majority of the unbroken capsules, the fluid force may be considered the secondary method of adding the accelerator to the cement slurry. Alternatively, the fluid may be considered the secondary method of adding the accelerator to the cement slurry because the fluid force is the second mechanism in a sequence of mechanisms that is capable of releasing the accelerator from the capsules.

In some cases, the fluid force produced by the turbulent flow may not be successful at breaking all remaining unbroken capsules within the cement slurry. Accordingly, all or some of the remaining unbroken capsules may melt (49) (FIG. 3) and thereby release their accelerator into the cement slurry. In this regard, in some implementations, the capsules are produced to melt at a temperature higher than a bottom hole circulating temperature (BHCT) and below a bottom hole static temperature (BHST). In an example, the BHCT is the temperature downhole while the cement slurry is circulating. In an example, the BHST is the temperature downhole when the cement slurry is static, for example, not circulating. The bottom hole may include a region between the last casing and an end point, or bottom, of the wellbore. Accordingly, in some implementations, the capsules will melt once the cement slurry is static and reaches, or approaches, the BHST. In an example, casing may be run to about 11,000 feet (about 3350 meters) to the bottom of a wellbore having a BHCT of 210° F. (about 99° C.) and a BHST of 250° F. (about 121° C.). The capsules are designed to have a melting point within a range of about 220° F. (about 104° C.) to about 240° F. (about 115° C.). Accordingly, when the circulation—for example, the turbulent flow—of the cement slurry stops, the temperature of the cement slurry approaches, and may reach, the BHST. As the temperature increases, unbroken capsules will melt and release the remaining accelerator into the cement slurry.

Figure 7:
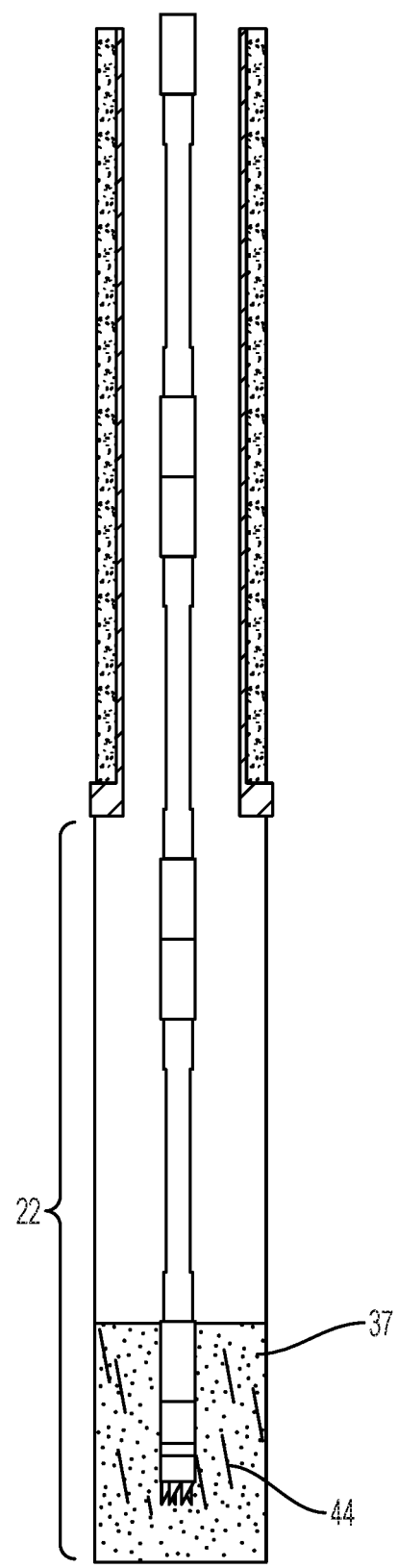

FIG. 7 shows released accelerator 44 within cement slurry 37. In this example, no unbroken capsules remain. Referring to FIG. 3, the accelerator reacts (50) with the cement slurry to thicken the cement slurry. The accelerator may reduce the thickening time (for example, the WOC time) of the cement slurry relative to a thickening time of cement slurry that does not include the accelerator. In an example, the cement slurry is thickened to produce a compressive strength of at least 500 pounds-per-square-inch (PSI). However, other thicknesses may be achieved based on the circumstances.

All or part of the system and methods described in this specification and their various modifications (subsequently referred to as "the processes") may be controlled at least in part by a control system comprised of one or more computing systems using one or more computer programs. Examples of computing systems include, either alone or in combination, one or more desktop computers, laptop computers, servers, server farms, and mobile computing devices such as smartphones, features phones, and tablet computers.

The computer programs may be tangibly embodied in one or more information carriers, such as in one or more non-transitory machine-readable storage media. A computer program can be written in any form of programming language, including compiled or interpreted languages, and it can be deployed as a stand-alone program or as a module, part, subroutine, or unit suitable for use in a computing environment. A computer program can be deployed to be executed on one computer system or on multiple computer systems at one site or distributed across multiple sites and interconnected by a network.

Actions associated with implementing the systems may be performed by one or more programmable processors executing one or more computer programs. All or part of the systems may be implemented as special purpose logic circuitry, for example, an field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media.

Non-transitory machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks such as internal hard disks or removable disks, magneto-optical disks, and CD (compact disc) ROM (read only memory) and DVD (digital versatile disk) ROM.

Each computing device may include a hard drive for storing data and computer programs, one or more processing devices (for example, a microprocessor), and memory (for example, RAM) for executing computer programs. Each computing device may include an image capture device, such as a still camera or video camera. The image capture device may be built-in or simply accessible to the computing device.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising:
   a casing to line at least part of a wellbore;
   a pipe to introduce cement slurry containing capsules into the wellbore, the capsules comprising an accelerator, the accelerator to react with the cement slurry to affect a thickening time of the cement slurry; and
   a substructure occupying a terminal end of the pipe, the substructure having an output to the wellbore, the output comprising shearing pins, the substructure being arranged to receive the cement slurry from the pipe and to pass the cement slurry through the shearing pins to the wellbore, the substructure being configured to rotate while the cement slurry exits the pipe, where rotation of the substructure causes the shearing pins to rotate and thereby to break at least some of the capsules in the cement slurry.

2. The system of claim 1, where the accelerator comprises calcium dichloride ($CaCl_2$)).

3. The system of claim 1, where the accelerator comprises anhydrous sodium metasilicate.

4. The system of claim 1, where the accelerator is at least 4% by weight of the cement slurry.

5. The system of claim 1, where the substructure is configured rotate within the cement slurry to produce a turbulent flow within the cement slurry.

6. The system of claim 5, where the turbulent flow has sufficient force to break at least some of the capsules.

7. The system of claim 6, further comprising:
   one or more pumps to force the cement slurry through the pipe, the one or more pumps being controllable to pump the slurry at a rate that produces the turbulent flow.

8. The system of claim 7, further comprising:
   a control system to control operation of the one or more pumps, the control system comprising a computer system.

9. The system of claim 1, where the substructure extends from a part uphole to a part downhole, the shearing pins being located at the part downhole.

10. The system of claim 1, where a region between the casing and a bottom of the wellbore has a temperature; and
    where the capsules melt, at least partly, at the temperature.

11. The system of claim 1, where affecting the thickening time of the cement slurry comprises reducing the thickening time of the cement slurry relative to a thickening time of cement slurry that does not include the accelerator.

12. A method comprising:
    forcing cement slurry containing capsules into at least a part of a wellbore through a shearing substructure located in the wellbore at a terminal end of a pipe, the shearing substructure having an output to the wellbore, the capsules comprising an accelerator, the accelerator to react with the cement slurry to affect a thickening time of the cement slurry;
    breaking at least some of the capsules using the shearing substructure, the shearing substructure comprising shearing pins located at the output of the shearing substructure, the shearing substructure being configured to rotate to cause the shearing pins to rotate while the cement slurry passes through the shearing pins, thereby causing the at least some of the capsules passing through the shearing substructure to break;

breaking more of the capsules using a turbulent flow produced within the cement slurry in the wellbore; and melting a portion of the capsules within the cement slurry in the wellbore.

13. The method of claim 12, where the accelerator comprises calcium dichloride ($CaCl_2$).

14. The method of claim 12, where the accelerator comprises anhydrous sodium metasilicate.

15. The method of claim 12, where the accelerator is at least 4% by weight of the cement slurry.

16. The method of claim 12, where the shearing substructure is configured rotate within the cement slurry to produce the turbulent flow within the cement slurry.

17. The method of claim 16, where force of the cement slurry caused by the turbulent flow causes at least some of the capsules to break.

18. The method of claim 17, further comprising:

controlling one or more pumps to pump the cement slurry through a pipe in the wellbore to which the shearing substructure is connected, the one or more pumps being controllable to pump the slurry at a rate that produces the turbulent flow.

19. The method of claim 18, further comprising:

controlling the one or more pumps and the shearing substructure using commands output by a control system, the control system comprising a computer system.

20. The method of claim 12, where the shearing substructure extends from a part uphole to a part downhole; and where the shearing pins are located at the part downhole to break the at least some of the capsules.

21. The method of claim 12, where a region between the casing and a bottom of the wellbore has a temperature; and where the capsules melt, at least partly, at the temperature.

22. The method of claim 12, where affecting the thickening time of the cement slurry comprises reducing the thickening time of the cement slurry relative to a thickening time of cement slurry that does not include the accelerator.

* * * * *

UNITED STATES PATENT AND TRADEMARK OFFICE
CERTIFICATE OF CORRECTION

PATENT NO. : 10,711,566 B2  
APPLICATION NO. : 16/037033  
DATED : July 14, 2020  
INVENTOR(S) : Ziyad Alsahlawi and Ossama R. Sehsah Page 1 of 1

It is certified that error appears in the above-identified patent and that said Letters Patent is hereby corrected as shown below:

In the Claims

In Claim 5, Column 8, Line 34, please insert --to-- between "configured" and "rotate".

In Claim 16, Column 9, Line 18, please insert --to-- between "configured" and "rotate".

Signed and Sealed this  
Thirteenth Day of October, 2020

Andrei Iancu  
*Director of the United States Patent and Trademark Office*